(12) United States Patent
Noma et al.

(10) Patent No.: US 7,152,101 B2
(45) Date of Patent: Dec. 19, 2006

(54) COMMUNICATION CONTROL METHOD, COMMUNICATION CONTROL APPARATUS, AND ADSL COMMUNICATION APPARATUS

(75) Inventors: Nobuhiko Noma, Yokohama (JP); Tatsuo Imai, Chigasaki (JP); Keiichi Tomita, Yokohama (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 704 days.

(21) Appl. No.: 10/183,475

(22) Filed: Jun. 28, 2002

(65) Prior Publication Data

US 2003/0055988 A1 Mar. 20, 2003

(30) Foreign Application Priority Data

Sep. 14, 2001 (JP) ............................. 2001-279556

(51) Int. Cl.
    *G06F 15/16* (2006.01)
(52) U.S. Cl. ..................... 709/221; 709/223; 709/225; 715/781
(58) Field of Classification Search ................ 709/221, 709/223, 225; 715/781
    See application file for complete search history.

(56) References Cited

U.S. PATENT DOCUMENTS

| | | | | |
|---|---|---|---|---|
| 5,905,476 A | * | 5/1999 | McLaughlin et al. | 715/781 |
| 6,335,966 B1 | * | 1/2002 | Toyoda | 379/100.06 |
| 6,453,372 B1 | * | 9/2002 | Mizunuma et al. | 710/52 |
| 6,687,742 B1 | * | 2/2004 | Iwazaki | 709/206 |
| 6,826,625 B1 | * | 11/2004 | Fujise et al. | 709/246 |
| 6,842,429 B1 | * | 1/2005 | Shridhar et al. | 370/252 |
| 2001/0040918 A1 | * | 11/2001 | Krinsky et al. | 375/222 |
| 2003/0018767 A1 | * | 1/2003 | Chatani et al. | 709/223 |
| 2003/0055925 A1 | * | 3/2003 | McAlinden | 709/221 |
| 2003/0097443 A1 | * | 5/2003 | Gillett et al. | 709/225 |

* cited by examiner

*Primary Examiner*—Viet D. Vu
*Assistant Examiner*—Jinsong Hu
(74) *Attorney, Agent, or Firm*—Greenblum & Bernstein, P.L.C.

(57) ABSTRACT

A communication control method detects whether an opposing apparatus is capable of performing an abbreviated procedure during a handshake step, declares an initiation of the abbreviated procedure if the opposing apparatus is capable of performing the abbreviated procedure, omits a negotiation prior to transmitting a MEDLEY signal, allows a remote side to transmit capacity information and reception result once to a center side after exchanging the MEDLEY signal, and further allows the center side to transmit the final capacity and transmission speed information to the remote side, in order to complete the initialization sequence.

8 Claims, 9 Drawing Sheets

Fig.4

Function display list of R-side

| ReedSoloman<br>ParityBytes per R-S code word | Fast Buffer | Interleaved Buffer |
|---|---|---|
| R=0 | Enable or Disable | Enable or Disable |
| R=2 | Enable or Disable | Enable or Disable |
| R=4 | Enable or Disable | Enable or Disable |
| R=6 | Enable or Disable | Enable or Disable |
| R=8 | Enable or Disable | Enable or Disable |
| R=10 | Enable or Disable | Enable or Disable |
| R=12 | Enable or Disable | Enable or Disable |
| R=14 | Enable or Disable | Enable or Disable |
| R=16 | Enable or Disable | Enable or Disable |
| DMT Symbols per R-S code word | | |
| S=1 | Enable | Enable or Disable |
| S=2 | - | Enable or Disable |
| S=4 | - | Enable or Disable |
| S=8 | - | Enable or Disable |
| S=16 | - | |
| Interleaved Depth | | |
| D=1 | - | Enable or Disable |
| D=2 | - | Enable or Disable |
| D=4 | - | Enable or Disable |
| D=8 | - | Enable or Disable |
| D=16 | - | Enable or Disable |
| D=32 | - | Enable or Disable |
| D=64 | - | Enable or Disable |

Fig.5

Function request of C-side

|  | Fast Buffer | Interleaved |
|---|---|---|
| ParityBytes per R-S code word | R=Any one of 0-16 | R=Any one of 0-16 |
| DMT Symbols per R-S code word | S=1 | S=Any one of 1-16 |
| Interleaved Depth | D=Any one of 1-64 | D=Any one of 1-64 |

Fig.8

| Center side | | | | Remote side | |
|---|---|---|---|---|---|
| | C-GALF2 (G.994.1) | C-FLAG2 (G.994.1) | | R-GALF2 (G.994.1) / R-FLAG2 (G.994.1) | |
| ≥128 ≤2048 | C-QUIET2 | | | R-QUIET2 | ≤8000 |
| | if R-ACK2 | if R-ACK1 C-PILOT1A | ≥128 | | |
| | C-PILOT1 | C-QUIET3A | ≤16 ≥496 ≤512 / ≥512 ≤516 | | |
| 512 | C-REVERB1 | | | R-REVERB1 | 4096 |
| 3072 | C-PILOT2 | | | | |
| 512 | C-ECT | | | R-QUIET3 | ≥2047 ≤2048 |
| 1536 | C-REVERB2 | | | | |
| 512 | R-ACK2 then C-PILOT3 / R-ACK1 then C-QUIET5 | | | R-ECT | 512 |
| 1024 | C-REVERB3 | | Introduction of cyclic prefix | R-REVERB2 | ≥1024 ≤1056 |
| 10 | C-SEGUE1 | | | R-SEGUE1 | 10 |
| 1072 | C-RATES1/C-CRC1 C-MSG1/C-CRC2 | | | R-REVERB3 | ≥1092 ≤4000 |
| | | | ≥20 ≤2928 | R-SEGUE2 | 10 |
| | | | | R-RATES1/R-CRC1 R-MSG1/R-CRC2 | 464 |
| 16384 | C-MEDLEY | | | R-MEDLEY | 16384 |

COMMUNICATION CONTROL METHOD, COMMUNICATION CONTROL APPARATUS, AND ADSL COMMUNICATION APPARATUS

BACKGROUND OF THE INVENTION

1. Field of the Invention

This invention relates to a communication control apparatus employing an xDSL technology that enables a high-speed communication of several M bits/second even when a copper wire cable is used for the subscriber line. This invention especially relates to an ADSL communication control method, communication control apparatus, and ADSL communication apparatus that performs an initialization procedure after performing a handshake procedure.

2. Description of Related Art

With the widespread use of the Internet, there is an increasing demand for a high-speed access line that can be used for a fixed connection. Optical fiber is becoming more popular in the backbone of communication industries, and gigabit class super high-speed lines are starting to be employed in the key components of the backbone. However, most of the subscriber lines that connect user's home and storage centers of the communication industries are copper wire cables that are constructed for telephones. Therefore, an introduction of the xDSL technology that enables a high-speed communication of several M bits/second with a copper wire cable has been considered.

An ADSL method is one aspect of the xDSL technology. The ADSL method uses a much higher carrier frequency range of more than 35 kHz compared to the range used for telephones (less than 4 kHz). Therefore, high-speed data communication can be performed using a telephone line, without hindering telephone functions.

FIG. 7 is a schematic illustration of a system configuration of a subscriber side. The storage center of a communication industry (center side) transmits signals to line 1. User's home (remote side) splits received signals from line 1 at splitter 2, inputting voice range signals (less than 4 kHz) into a telephone (POTS: Plain Old Telephone Service) 3, and high range signals (more than 35 kHz) into ADSL communication apparatus 4. ADSL communication apparatus 4 includes ADSL modem 5 and controller 6. Controller 6 controls data transmission/reception with data communication apparatus 7 (e.g., personal computer) and performs an initialization control for ADSL modem 5.

FIGS. 8 and 9 illustrate initialization sequence that is performed at ADSL modem 5 based on the ITU-T recommended G.992.1. In the example of FIG. 8, the control is arranged to perform a handshake procedure based on the ITU-T recommended G.994.1, prior to performing an initialization sequence.

In an initialization sequence based on the ITU-T recommended G.992.1, the center side transmits C-RATES1 and C-MSG1 to the remote side as the first negotiation, informing a general transmission speed for the downlink and uplink and additive information. In response, the remote side transmits R-RATES1 and R-MSG1 to the center side, informing the remote side's transmission speed and additive information.

After the first negotiation, both center and remote sides transmit training signals, C-MEDLEY and R-MEDLEY, so that both center and remote sides check the reception conditions and determine carriers for carrier-off and bit number used for each carrier. As a second negotiation, the remote side transmits R-RATES and R-MSG to the center side, informing the center side of the remote side's capacity information and information regarding the reception conditions (e.g., S/N). The center side determines detail information (transmission speeds for uplink and downlink) and capacity information based on the reception result of R-MEDLEY, and transmits C-RATES and C-MSG to the remote side to inform the center side's capacity information and detail information regarding the reception conditions.

After the second negotiation, the remote side determines the remote side's capacity information and transmission speeds for uplink and downlink, based on the capacity information and transmission speeds for uplink and downlink received from the center side at the second negotiation. As a third negotiation, the remote side transmits R-RATES2 and R-MSG2 to the center side, informing the capacity information and transmission speeds for uplink and downlink decided at the remote side. Upon receiving R-RATES2 and R-MSG2 from the remote side, the center side transmits the information with the same content as C-RATES2 and C-MSG2 to the remote side, if there is no change in the capacity information and transmission speeds for uplink and downlink decided at the second negotiation. And the center side declares that the communication will be performed with the capacity information, transmission speeds for uplink and downlink, and additive information determined by the center side.

Lastly, the center side transmits the capacity information, transmission speeds for uplink and downlink, and additive information declared at the third negotiation as C-B&G to the remote side. The remote side transmits the capacity information, transmission speeds for uplink and downlink, and additive information instructed by the center side as R-B&G to the center side.

As described above, the center and remote sides perform three negotiations, in which carrier number for carrier, bit allocation for each carrier, and B&G that sets gain information for the carrier are finally exchanged to be used, to complete the initialization sequence. Upon normally completing the initialization sequence, the data communication begins (SHOWTIME).

It takes about 10 to several tens of seconds for the above-described ADSL communication apparatus to start a data transmission (SHOWTIME) after the power is turned on. However, in a situation where the ADSL communication apparatus is connected to a personal computer via the USB, the power for the ADSL communication apparatus is cut off when the power to the personal computer is shut down. Therefore, every time a user turns on the power for the personal computer, an initialization sequence of the ADSL communication apparatus is performed, thus the user feels that the initialization sequence is taking a long time.

SUMMARY OF THE INVENTION

The object of the invention is to provide a communication control apparatus, communication control method, and ADSL communication apparatus that can shorten the initialization sequence performed when the power is turned on with the ADSL method, and decrease the stress of the user.

Upon detecting that the opposing model is able to perform an abbreviated procedure during a handshake procedure, the apparatus according to the present invention declares to perform the abbreviated procedure, omits the negotiation prior to a MEDLEY signal transmission, further allows the remote side to transmit capacity information and line conditions once to the center side after exchanging MEDLEY signals, allows the center side to transmit the final capacity and transmission speed information to the remote side, and completes the initialization sequence.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 4 illustrates a list of function display of the remote side according to the embodiment;

FIG. 5 illustrates a content of function request from the center side according to the embodiment;

FIG. 8 is a first half of the initialization sequence based on ITU-T recommended G.992.1.

DETAILED DESCRIPTION OF PREFERRED EMBODIMENTS

The embodiment of the present invention applied to an ADSL communication apparatus is explained in the following, in reference to the above-described drawings.

Figure 1:
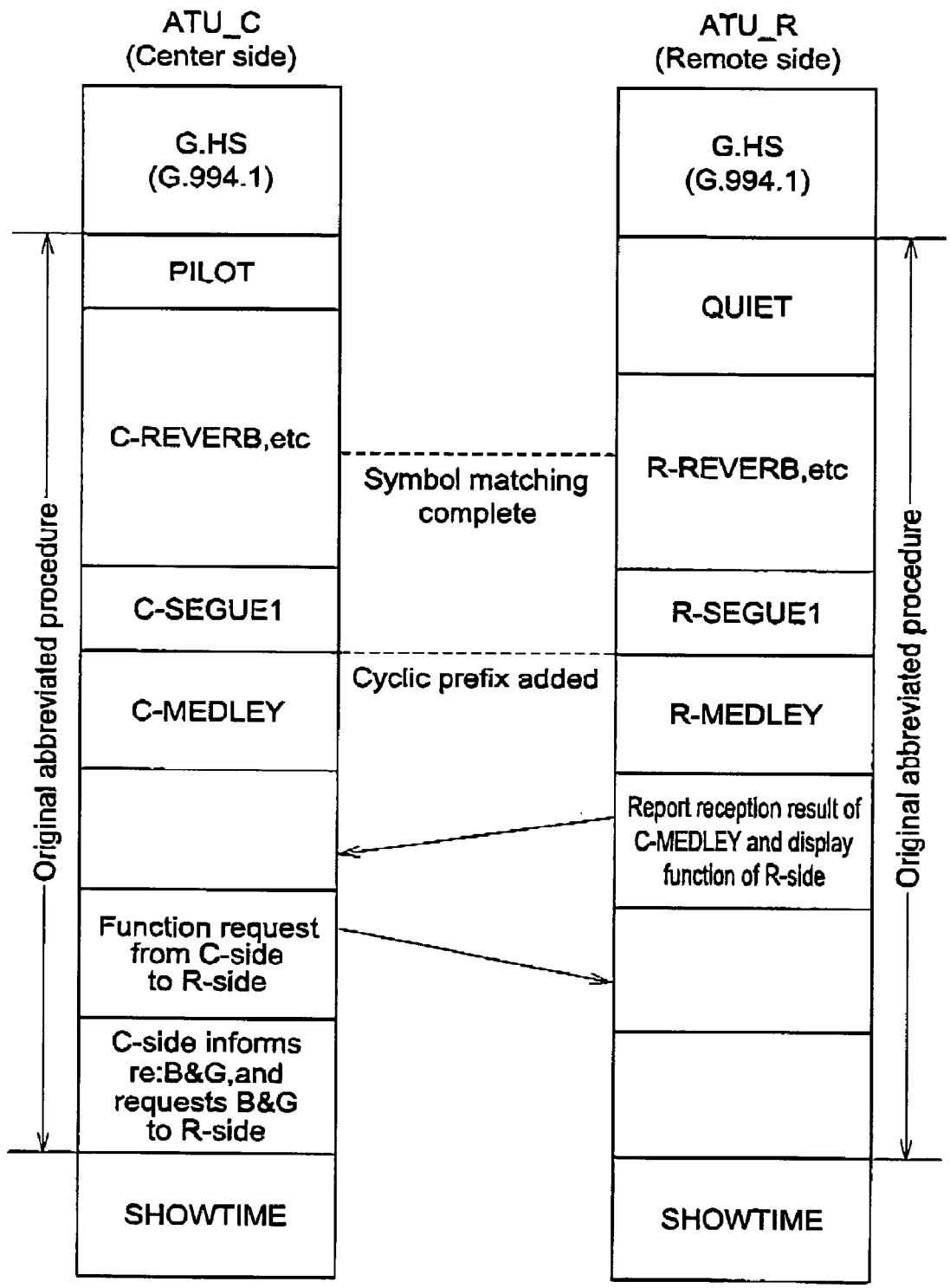
FIG. 1 is a sequence chart illustrating an initialization sequence of abbreviated procedure performed according to an embodiment of the present invention.

FIG. 1 illustrates a handshake procedure and initialization sequence performed between the center and remote sides. The center and remote sides separately have ADSL communication apparatuses that are able to perform the sequence of FIG. 1. FIG. 1 illustrates an example of an original abbreviated procedure as an initialization sequence.

When the ADSL communication apparatus at the remote side is turned on, the ADSL communication apparatus sends a connection request to the ADSL communication apparatus at the center side, so that the line between the remote and center sides is connected. In this embodiment, the ADSL communication apparatus at the center side is always ready to reply to the remote side's connection request.

When the line is established between the remote and center sides, a handshake procedure is performed. FIG. 1 illustrates a handshake procedure based on the ITU-T recommended G.994.1. In the present embodiment, the handshake procedure checks whether the opposing apparatus is capable of performing an abbreviated procedure. If the opposing apparatus is capable of performing the abbreviated procedure, the original abbreviated procedure is performed.

Figure 2:
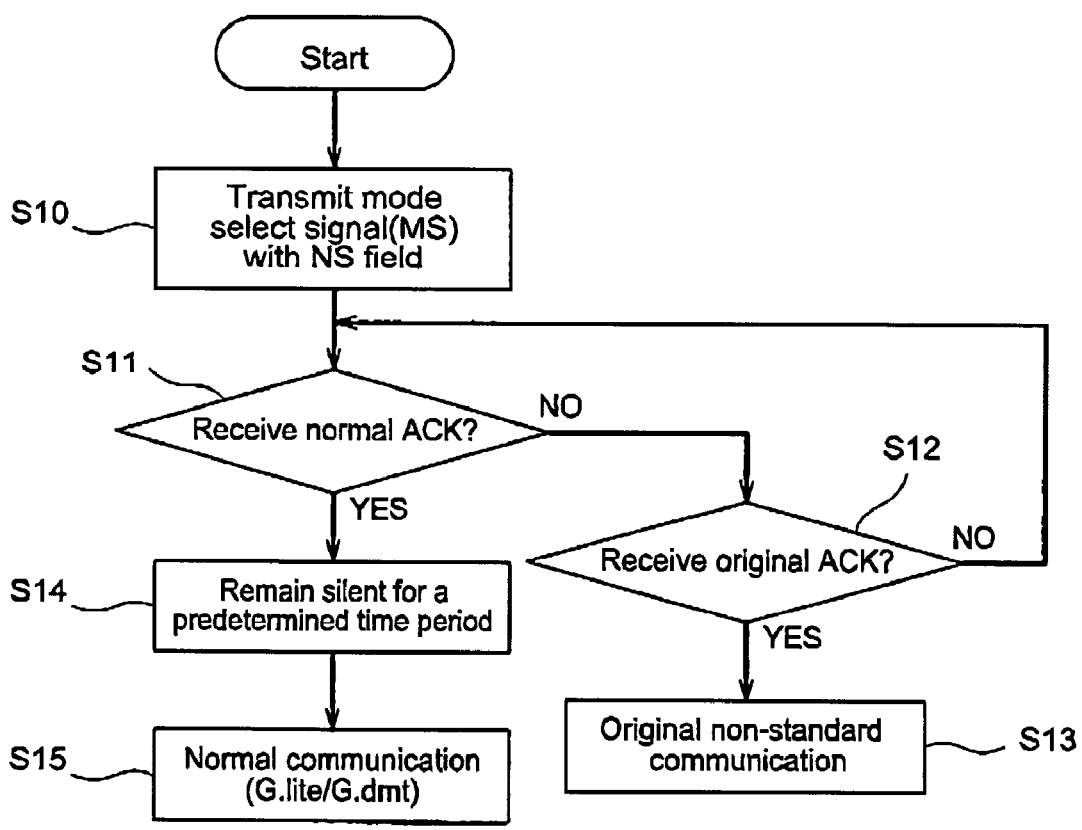
FIG. 2 is a flowchart of a handshake procedure performed by a remote side according to the embodiment.

FIG. 2 is a flowchart for the remote side to determine whether the abbreviated procedure is possible during the handshake procedure. The remote side transmits a mode select signal (MS) with NS (Non-Standard Information) field to the center side (Step 10).

Figure 3:
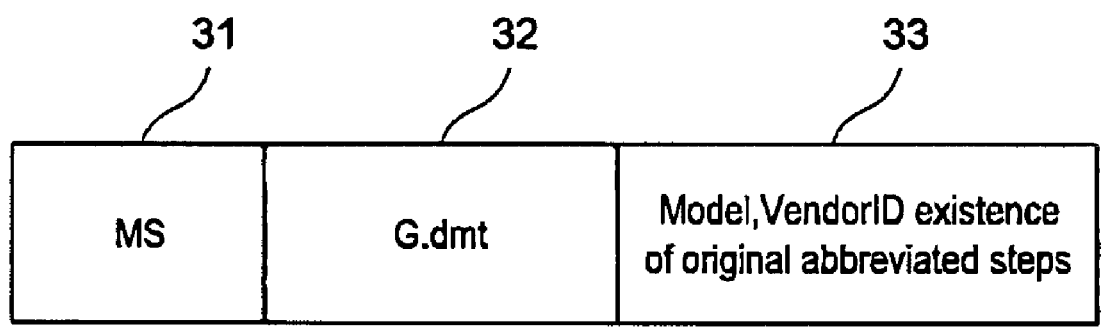
FIG. 3 illustrates a field configuration of a mode select signal used according to the embodiment.

FIG. 3 illustrates a field configuration of the mode select signal (MS). As shown in figure, the mode select signal (MS) is provided with identification field 31, standard information field 32, and non-standard information field 33. In identification field 31, a command regulating the overall features of the handshake procedure is set. The example in FIG. 3 shows that the command "MS" is set stating that it is a mode select signal. In standard information field 32, standard information such as the initialization sequence and communication method used for the data communication is set. For example, when identification information field 31 sets "MS", standard information field 32 sets "G.dmt". When non-standard information 33 is not included, the initialization sequence and data communication is arranged to perform based on the ITU-T recommended G.dmt. Non-standard information field 33 is a field that a maker can set their original information. In this embodiment, vender ID, modem model, and information whether the abbreviated procedure is available are set to inform that the remote side is capable of performing the abbreviated procedure. The invention is not limited to the above information as long as the information set in non-standard information field 33 is capable of informing the opposing side that the apparatus can perform the abbreviated procedure.

There are situations in which the center side model can or cannot analyze and recognize non-standard information field 33 of the mode select signal transmitted by the remote side. In this embodiment, if the center side model is capable of analyzing non-standard information field 33 and recognizing the information, it is considered that the abbreviated procedure shown in FIG. 1 can be performed.

When the center side model is capable of analyzing non-standard information field 33 and recognizing the information, the center side transmits an original ACK to the remote side to inform that the abbreviated procedure can be performed. If non-standard information field 33 cannot be recognized, a normal ACK (ACK according to the ITU-T recommendation) corresponding to identification field 31 and standard information field 32 is transmitted to the remote side.

The remote side analyzes the ACK received from the center side and checks whether it is a normal ACK (Step 11). If it is not a normal ACK, the remote side checks whether it is an original ACK (Step 12). If it is an original ACK sent from the center side, the initialization according to the abbreviated procedure shown in FIG. 1 is performed (Step 13).

Figure 9:
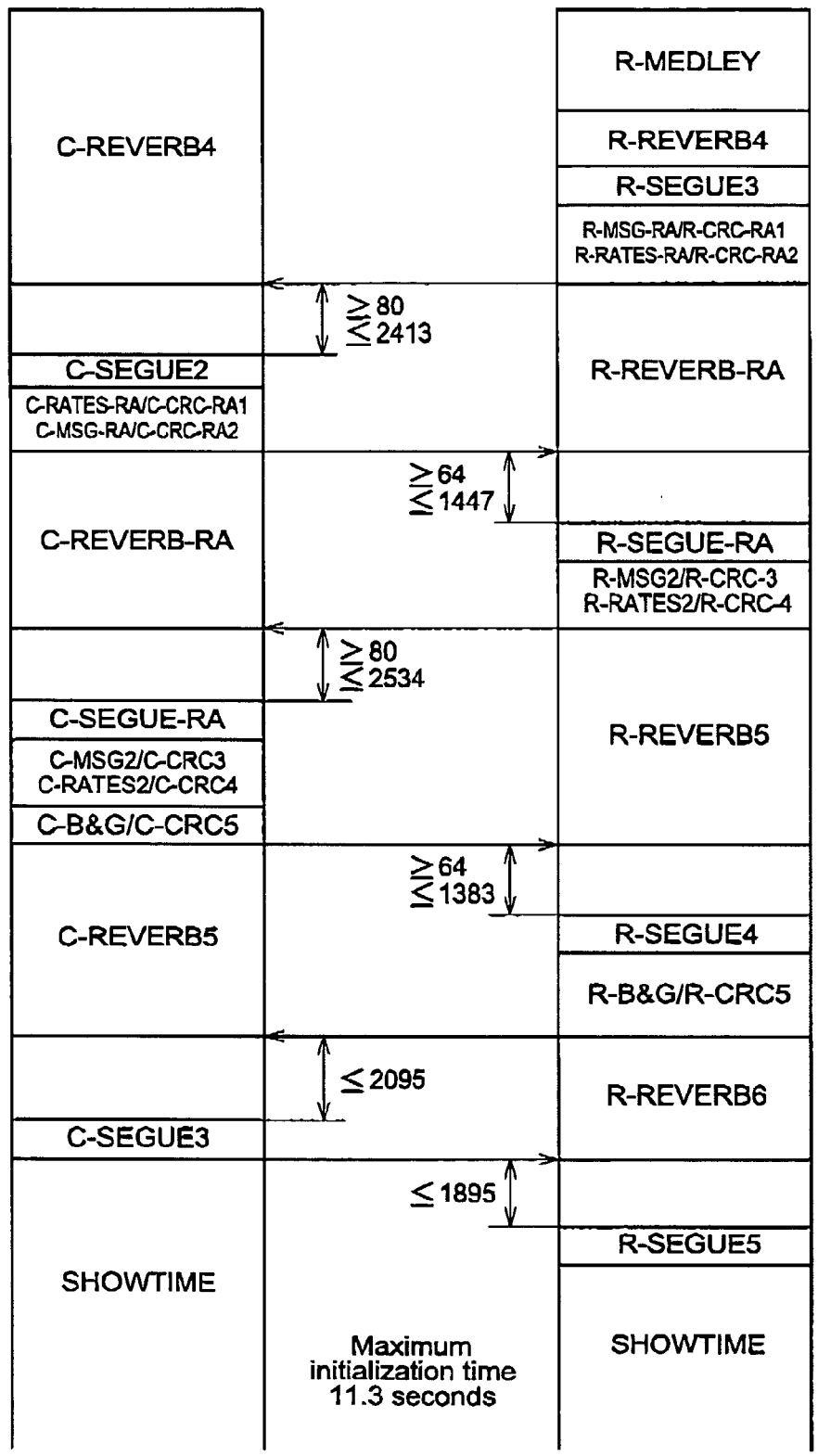
FIG. 9 is a second half of the initialization sequence based on ITU-T recommended G.992.1.

When it is a normal ACK sent from the center side, the remote side remains silent for a predetermined time period without performing the abbreviated procedure (Step 14), and performs the initialization sequence according to the ITU-T recommendation as shown in FIGS. 8 and 9 for example (Step 15).

Accordingly, during the handshake procedure performed prior to the initialization sequence, whether the opposing model is capable of performing the abbreviated procedure is checked. Therefore, it is possible to make a transition to the standard initialization sequence when the opposing model cannot perform the abbreviated procedure, thereby preventing to perform unnecessary procedures.

Next, an initializing sequence for performing an original non-standard communication (original procedure) at Step 13 is illustrated using FIG. 1. Upon confirming that both center and remote sides will perform the above-described abbreviated procedure at the handshake procedure, the center side transmits PILOT, and the remote side transmits QUIET. Then, the center side transmits a REVERB signal (e.g., C-REVERB) and the remote side transmits a REVERB signal (e.g., R-REVERB) to match symbols (synchronization).

When the center side informs the remote side that the signal is switched by transmitting a SEGUE signal (C-SEGUE1), the center side starts the transmission of C-MEDLEY without performing a RATES sequence. The remote side, on the other hand, after transmitting R-REVERB2, informs the center side that the signal is switched by transmitting a SEGUE signal (R-SEGUE1). Then, the remote side starts the transmission of R-MEDLEY without performing the RATES sequence.

Accordingly, the sequence for exchanging RATES1 conventionally performed prior to exchanging of MEDLEY is omitted, thereby abbreviating the initialization sequence. It is preferable to omit C-REVERB1, C-ECT, R-ACK1, and R-ACK2 at the center side, and R-REVERB1 and R-ECT at the remote side. In this situation, C-REBERB2 and C-REBERB3 of the center side become one signal, and R-QUIET2 and R-QUIET3 of the remote side become one signal as shown in FIG. 1.

After receiving C-MEDLEY, the remote side transmits S/N information containing the reception result and function display list of the remote side to the center side. FIG. 4 illustrates the function display list of the remote side. The function display list shown in FIG. 4 includes a parameter "R" indicating what byte Reed-Solomon code can be added, a parameter "S" indicating per what byte Reed-Solomon code can be added, and a parameter "D" indicating how deep an interleave can be performed. In FIG. 4, there are fast buffer, which is a path not performing an interleave, and interleaved buffer, which is a path performing the interleave.

The center side selects a parameter from the function display list received from the remote side. In particular, the center side compares the abilities of the remote and center sides to select the function that can achieve the highest performance (parameters "R", "S", and "D"). Then, the center side transmits a "function request" requesting the remote side to perform the communication with the function selected by the center side. FIG. 5 is an example of the function request from the center side.

Also, based on the S/N information received from the reception side and the reception result of R-MEDLEY (S/N information) received from the remote side, the center side calculates an optimal B&G (incoming B&G), a setting for the center side to receive, and an optimal B&G (outgoing B&G), a setting for the remote side to receive. Then, the center side informs the remote side regarding an outgoing B&G, while requesting for an incoming C-B&G. Additionally, a B&G includes a carrier number for the carrier to be used, bit number for every carrier used, and gain for every carrier used.

Accordingly, after exchanging the MEDLEY signal, the center side is required to receive the reception result of the MEDLEY signal from the remote side and function display list of the remote side only once, in order to decide the incoming and outgoing B&G, inform the remote side, and perform a data transmission. Therefore, a capacity information exchange and speed information setting is completed with an extremely simplified procedure, thereby simplifying the content of the process and abbreviating the initialization procedure.

Figure 6:
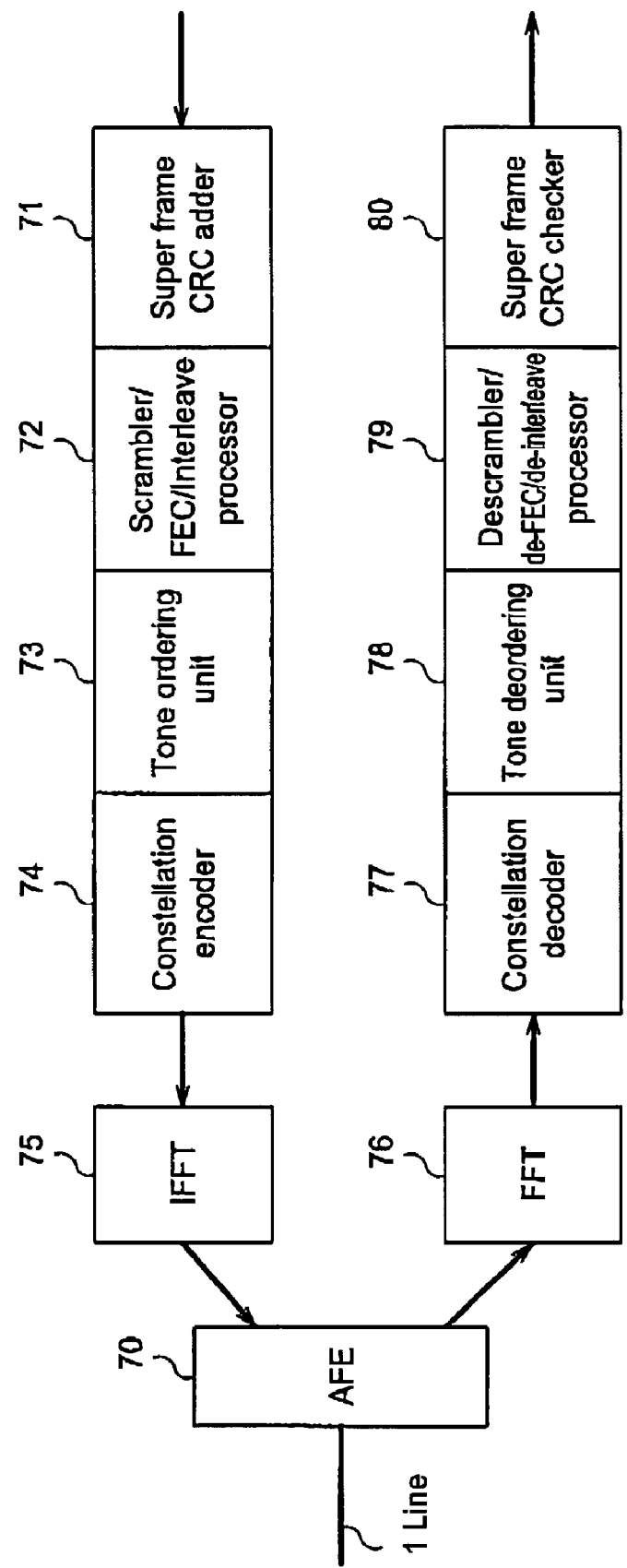
FIG. 6 is a partial functional block diagram of an ADSL communication apparatus according to the embodiment.
Figure 7:
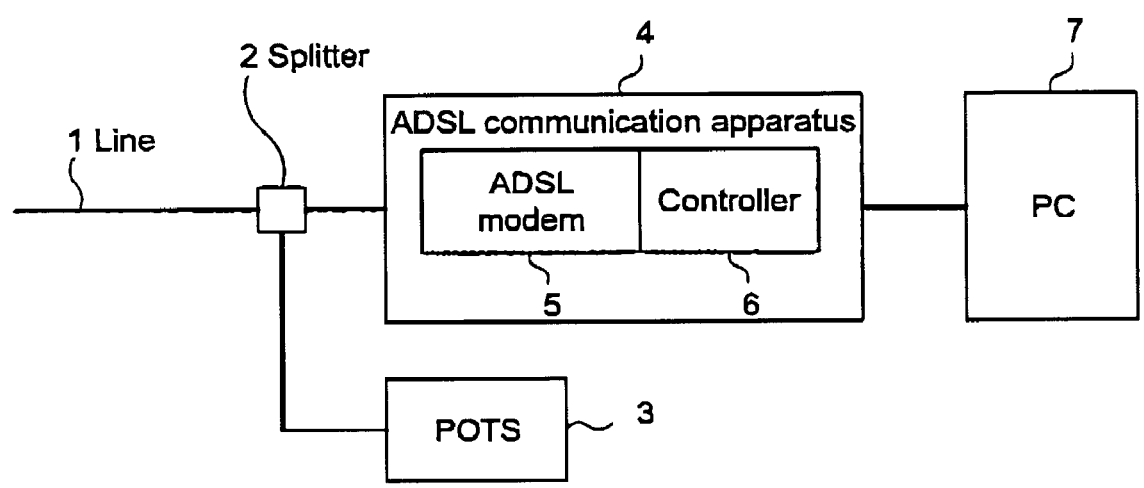
FIG. 7 is a schematic system configuration of the remote side.

FIG. 6 illustrates a configuration of a modem section of the ADSL communication apparatus of the center and remote sides. The modem section of the ADSL communication apparatus is connected to line 1 via analog front end (AFE) 70. Analog front end (AFE) 70 has a DA conversion function that converts digital signals transmitted to a line into analog signals, and AD conversion function that converts analog signals input from a line into digital signals. The sender side has super frame CRC adder 71 that adds a check bit in front of a super frame, scrambler/FEC/interleave 72 that performs a scramble process spreading the transmission frequencies, forward/error/correction process adding symbols for correcting errors, and interleave process, tone ordering unit 73 that performs tone ordering process controlling the carrier ordering for bit allocation, constellation encoder 74 that converts symbols into topology information on an I-Q plane with a predetermined bit unit, and inverse fast Fourier transformer 75. The receiver side has fast Fourier transformer 76 that performs a fast Fourier conversion on the reception signals output from analog front end 70, constellation decoder 77 that converts the topology information on the I-Q plane output for every carrier from fast Fourier transformer 76 into bit information, tone de-ordering unit 78 that rearranges the signals in the original positions after the tone ordering process at the sender side, de-scrambler/de-FEC/de-interleave unit 79 that rearranges the scramble process, forward/error/correction process, and interleave process performed at the sender side, and super frame CRC check unit 80 that checks the reliability of the data after examining the check bit added in front of the super frame.

The sequence illustrated in FIG. 1 is performed by a controller (not shown) that controls the various functions as described above at both sender and receiver side.

Further, in the above-explanation, illustration is given when the present invention is applied to an ADSL communication apparatus, however, this invention can be applied to any xDSL apparatuses provided that they use the communication method performing an initialization sequence after performing a handshake procedure.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

This application is based on the Japanese Patent Application No. 2001-279556 filed on Sep. 14, 2001, entire content of which is expressly incorporated by reference herein.

What is claimed is:

1. A communication control apparatus of a remote side, comprising:
   a communication line controller that establishes a communication link with a center side;
   a transmitter that transmits a first signal to the center side during a handshake procedure after the communication link is established, the first signal comprising standard information and abbreviation information, the standard information indicating a standard communication sequence which the remote side is capable of performing, the abbreviation information indicating whether the remote side is capable of performing an original abbreviated procedure;

a receiver that receives a second signal, transmitted from the center side during the handshake procedure, that indicates that the center side is capable of performing the original abbreviated procedure, the second signal being transmitted in response to the first signal; and a communication controller that performs an initialization sequence according to the original abbreviated procedure prior to initiating a data communication, when the receiver receives the second signal indicating the center side is capable of performing the original abbreviated procedure during the handshake procedure, the initialization sequence determining a transmission speed and capacity to be used.

2. The communication control apparatus of claim 1, wherein said receiver receives a certain signal transmitted from the center side that indicates that the center side is capable of performing a standard initialization sequence, said communication controller performing said standard initialization sequence prior to initiating the data communication when said receiver receives said certain signal.

3. The communication control apparatus of claim 2, wherein said certain signal comprises a normal Acknowledge (ACK) signal.

4. The communication control apparatus of claim 1, wherein said communication control apparatus employs xDSL technology.

5. The communication control apparatus of claim 1, wherein said first signal comprises a Mode Select (MS) signal provided with a Non-Standard (NS) Information field containing data indicating that the remote side is capable of performing the original abbreviated procedure, and said second signal comprises an original Acknowledge (ACK) signal indicating that the center side is capable of performing the original abbreviated procedure.

6. A communication control apparatus of a center side, comprising:

a communication line controller that establishes a communication link with a remote side;

a receiver that receives a first signal from the remote side during a handshake procedure that comprises standard information and abbreviation information, the standard information indicating a standard communication sequence which the remote side is capable of performing, the abbreviation information indicating whether the remote side is capable of performing an original abbreviated procedure;

a returner that returns a second signal to the remote side when the receiver receives the first signal during the handshake procedure, and abbreviation information indicating whether the remote side is capable of performing the original abbreviated procedure; and a communication controller that performs an initialization sequence according to the original abbreviated procedure prior to initiating a data communication when it is determined that the remote side is capable of performing the original abbreviated procedure, the initialization sequence determining a transmission speed and capacity to be used prior to initiating a data communication.

7. The communication control apparatus of claim 6, wherein said communication control apparatus employs xDSL technology.

8. A high speed communication apparatus, comprising:

a transmitter that transmits a Mode Select (MS) signal to a communication apparatus during a handshake procedure, the MS signal including at least one of a standard information field and a non-standard information field, the non-standard information field including abbreviation information indicating whether the high speed communication apparatus is capable of performing an original abbreviated procedure;

a receiver that receives, from the communication apparatus in response to the MS signal, one of an original Acknowledge (ACK) signal that includes abbreviation information indicating that the communication apparatus is capable of performing the original abbreviated procedure, and a normal ACK signal that indicates the communication apparatus is capable of performing a standard initialization sequence, and a communication controller that performs one of the original abbreviated procedure and the standard initialization sequence prior to initiating a data communication in response to the receiver receiving one of the original ACK signal and the normal ACK signal.

* * * * *